Feb. 25, 1964   J. J. WILDER ETAL   3,121,878
METHOD OF MAKING SHOULDER PADS
Filed Dec. 28, 1959   11 Sheets-Sheet 8

INVENTOR.
JAMES J. WILDER
PHILIP C. FEFFER
BY ARTHUR L. FORSTER
LEWIS H. ZIRKLE
ATTORNEY

Feb. 25, 1964 J. J. WILDER ETAL 3,121,878
METHOD OF MAKING SHOULDER PADS
Filed Dec. 28, 1959 11 Sheets-Sheet 9

INVENTOR.
JAMES J. WILDER
PHILIP C. FEFFER
BY ARTHUR L. FORSTER
LEWIS H. ZIRKLE

Leo Edelson
ATTORNEY

Feb. 25, 1964 J. J. WILDER ETAL 3,121,878
METHOD OF MAKING SHOULDER PADS
Filed Dec. 28, 1959 11 Sheets-Sheet 11

INVENTOR.
JAMES J. WILDER
PHILIP C. FEFFER
ARTHUR L. FORSTER
LEWIS H. ZIRKLE
BY Leon Edelson
ATTORNEY

United States Patent Office 3,121,878
Patented Feb. 25, 1964

3,121,878
METHOD OF MAKING SHOULDER PADS
James J. Wilder, Annapolis, Philip C. Feffer, Sparks, and Arthur L. Forster and Lewis H. Zirkle, Baltimore, Md., assignors, by mesne assignments, to Penn Pad Company, Philadelphia, Pa., a corporation of Pennsylvania
Filed Dec. 23, 1959, Ser. No. 862,168
3 Claims. (Cl. 2—268)

This invention relates generally to the manufacture of shoulder pads as for example of the type used in men's suits and coats, and more particularly relates to the method of and apparatus for automatically stitching a shoulder pad pair and then shearing the stitched pad to form a pair of finished shoulder pads.

The present state of the shoulder pad manufacturing art is such that each shoulder pad pair is stitched on a sewing machine by a human operator. Certain of the stitching patterns required to be placed upon the pad pair require that the operator of the sewing machine be a relatively skilled worker. It has been found that a reasonable production level is difficult to maintain because of worker absenteeism and the relatively large number of unacceptable pads produced attributable to human inaccuracies occurring during the stitching operations.

The present invention contemplates the minimization of these sources of reduced production by providing a machine having the ability to stitch and cut completed shoulder pad pairs at a high rate of speed while at the same time producing a uniform completely repeatable pattern of stitching. The automatic machine according to the invention therefore eliminates the need for skilled or even semi-skilled sewing machine operators, reduces the number of unacceptably stitched shoulder pads to the irreducible minimum, and being operable at a high rate of speed increases the total production by a significant factor. By reason of the foregoing, substantial production economies are easily realizable making possible the realization of substantial savings. Accordingly, it is a primary object of this invention to provide a novel apparatus for automatically producing shoulder pads in large quantities at a higher rate of speed than may be achieved by the presently employed methods.

Another object of the invention is to provide novel apparatus for automatically producing shoulder pads which increases production efficiency by markedly reducing the proportion of produced pads which may be unacceptable to the trade.

Still another object of the invention is to provide a novel automatic shoulder pad producing apparatus which eliminates the need for skilled personnel, and thereby frees the rate of production from the uncertainties of worker absenteeism.

The foregoing and other objects of the invention will become apparent from a careful reading of the following specification together with an examination of the appended drawings, wherein.

In these several figures like elements are denoted by like reference characters.

In the invention to be described, a certain degree of complexity exists due to the fact that several mechanical elements are simultaneously in motion and are tracing irregular paths while at the same time switches are being thrown and solenoids are being energized and deenergized. In order that the timed relationships of the various mechanical and electrical elements of the apparatus may be understood most easily, and as a reference aid for quickly relocating explanatory sections of the specification relating to particular aspects of the apparatus, the following specification has been divided into six major sections. These major sections are arranged in an order such that an understanding of the first section provides an aid in understanding the second section, and so on. Some of the figures will be referred to in more than one of these sections, although generally such multiple reference will be directed toward different aspects of the apparatus. The major sections are as follows:

I. The Problem to be Solved and Stitching Configuration Desired—FIGURES 1, 2, 3
II. Organization—FIGURES 4, 5A
III. Mechanical Structures—FIGURES 6–21
IV. Transportation Cycle, Gross Arm Motions—FIGURES 4, 5A
V. Arm to Arm Pad Transfer Sequence—FIGURES 4, 5A, 22
VI. Stitching Pattern and Zig-Zag Circuits—FIGURES 1, 3, 23A–23G, 5A–5E As a further aid to the location of particular elements in the drawings, the following system of notation has been adopted. The twelve mechanically rotated cams are identified as C1 through C12; electrical switches are identified as S1 through S11; electrically operated solenoids are denoted by the notation L1 through L5; relays are designated K1 through K3; and the remainder of the elements are identified solely by numerals. Additionally, the showings of FIGURES 1, 2, 3 and 5A show thereon the legending B1 through B4, J1 through J4, SC and SMS, the meanings of which will become apparent as the description progresses.

I. THE PROBLEM TO BE SOLVED AND STITCHING CONFIGURATION DESIRED—FIGURES 1, 2, 3

Figure 1:
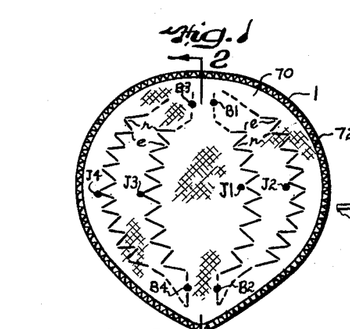
FIGURE 1 illustrates a stitched shoulder pad pair just prior to shearing in half to form a pair of separate complementally shaped pads.
Figures 2, 5A:
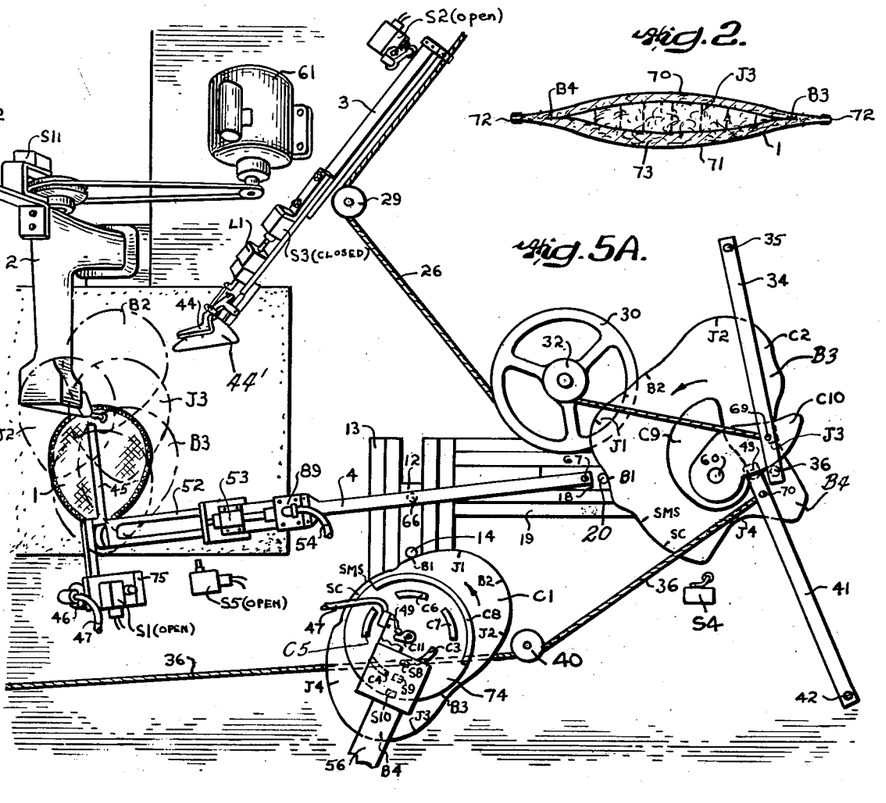
FIGURE 2 illustrates a section through the uncut shoulder pad pair illustrated in FIGURE 1 as viewed along the lines 2—2 therein, the lines 2—2 indicating the line along which the uncut shoulder pad pair is sheared.
FIGURES 5A through 5E illustrate the apparatus of FIGURE 4 in enlarged form and with certain details omitted for purposes of illustrating the relative position of parts during different portions of the stitching cycle.

FIGURE 1 illustrates the form that a typical uncut shoulder pad pair may take, the structure of the pad itself comprising generally an upper ply 70 and a lower ply 71 between which is sandwiched a filler portion 73. The edges of the pad are secured together and prevented from ravelling by an overcast edge stitching 72 known in the trade as serging or merrowing. As best seen in the showing of FIGURE 2, the top and bottom plies 70 and 71 are not parallel spaced but are relatively widely separated toward the center of the pad and approach each other as the edge of the pad is neared, this configuration being brought about by the contour of the filler or stuffing 73. Also appearing on the showing of FIGURE 1 is a pattern of interior stitching including the four straight-line stitched portions identified by the dots placed centrally thereon as B1, B2, B3 and B4, and the zig-zag stitched portions identified by the dots J1, J2, J3 and J4 lying approximately centrally along the extent of each contour of the zig-zag stitching. The straight-line portions identified as B1 through B4 are known as box stitch sequences and the zig-zag contoured patterns are known as jump stitch sequences. Thus, B1 is the first box stitch sequence, B2 is the second box stitch sequence and so on, while correspondingly J1 is the first jump stitch sequence, J2 is the second jump stitch sequence and so on.

Figure 3:
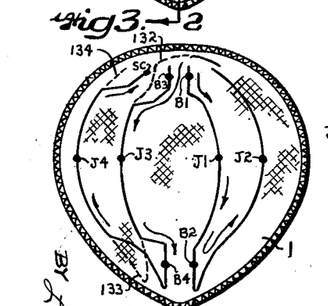
FIGURE 3 illustrates the general path traced by the sewing machine needle in the process of stitching a complete uncut shoulder pad pair, but does not show the zig-zag stitching pattern observed in the showing of FIGURE 1.

The illustrated pattern is normally stitched in one continuous sequence by the sewing machine operator following the arrowed path illustrated in the showing of FIGURE 3. From FIGURE 3 it is observed that the shoulder pad pair is stitched by sewing in order the first box stitch sequence, first jump stitch sequence, the second box stitch sequence, second jump stitch sequence, third box stitch sequence, third jump stitch sequence, fourth box stitch sequence, and finally the fourth jump stitch sequence. Upon completion of the foregoing stitching pattern the pad is removed to a shear press where it is cut in half on a line running parallel to and midway between the four box stitch sequences to thereby form a symmetrical pair of shoulder pads which in side elevation would appear as seen in FIGURE 2.

Although the shoulder pads seen in FIGURES 1, 2 and 3 are illustrated as being constructed in a particular manner, somewhat different shapes and constructions are also made by the industry. For example, a multi-ply filler or stuffing may be used, or an adhesively secured edging might be employed in place of the serging or merrowing 72, or a different number of box stitch and jump stitch sequences may be utilized as a function of the size and shape of the pad. Accordingly, it is to be understood that these variations as compared to the showings of FIGURES 1, 2 and 3 are all contemplated as falling within the scope of the present invention since the principles of the invention are equally well applicable to all of these variations, and indeed to others too numerous to here list. Basically, the major problem here solved is that of automatically stitching the uncut shoulder pad pair with the box stitch and jump stitch sequences and then automatically shearing the stitched pad to produce a symmetrical pair, while at the same time feeding a new pad into the apparatus for stitching to establish a repetitive cycle of operation consisting basically of pad stitching followed by pad shearing and the feeding of a new pad for stitching. It is precisely this cycle of operation that the apparatus according to the present invention carries out with high speed and precision.

The apparatus to be now described requires that a serged or otherwise held together uncut pad pair be fed to a loading station which is part of the apparatus, and that the subsequently automatically stitched and sheared shoulder pad be then packed for shipment, all intermediate operations being carried out automatically by the apparatus according to the invention. Thus, the apparatus to be described will transport the serged pad from the loading station to a sewing station, will sew the pad, and will then transport the pad from the sewing station to a shearing station where the stitched pad will be sheared and hence ready for packing. Understanding now the problem to be solved and the functions to be performed by the apparatus, attention should be now turned to the next two sections which, in order, describe in detail the organization of the various parts one to the other and the mechanical structure of the apparatus.

II. ORGANIZATION—FIGURES 4, 5A

Figure 4:
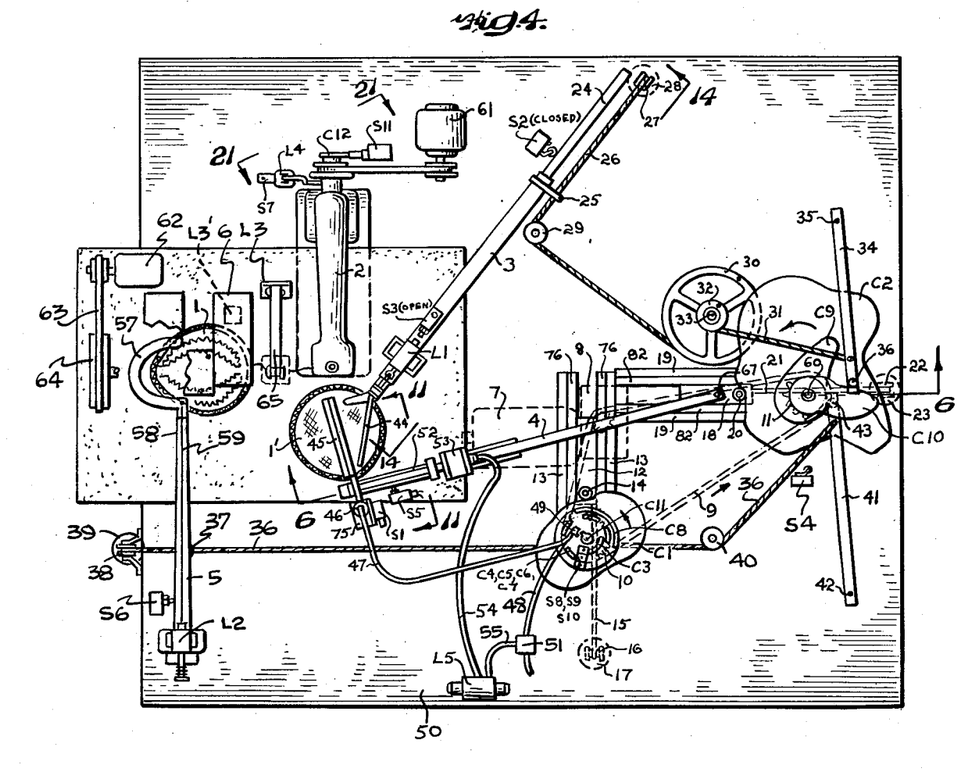
FIGURE 4 is a plan view of the apparatus according to the invention illustrating the several arms used to move the uncut shoulder pad pair through a stitching and shearing cycle together with the cams and switches used as control elements, the apparatus being illustrated in a bread board type of layout for clarity of viewing and ease of understanding the physical relationships amongst the various components.

FIGURE 4 illustrates in plan view the various component parts of the automatic shoulder pad sewing machine and their general organization relative to one another. FIGURES 6 through 21 are enlarged detailed views of individual ones of the various component parts which show more clearly the detailed structures thereof but the descriptions of these detailed showings will be more meaningful after first gaining a gross understanding of the interorganization of these components with one another, and for this purpose attention should be first directed to the showing of FIGURE 4.

The major operating elements of the apparatus comprise the sewing machine 2, the three operating arms 3, 4 and 5, and the shear press 6. The arm 3 will be referred to hereinafter as the loading arm because it is the arm which reciprocates between the loading station, where it receives an unstitched pad, and the sewing station where the pad is transferred to the sewing arm 4. The sewing arm 4 is so designated because this arm after receiving the unstitched pad from the loading arm 3 moves the pad under the sewing machine needle in a particular pattern to provide the desired stitched configuration and then moves the pad out from under the sewing machine 2 and transfers it to the arm 5 hereinafter designated as the unloading arm. The unloading arm 5, having received the stitched pad from the sewing arm 4, transports the stitched pad to the shear press 6 where the pad is cut in half to form a symmetrical shoulder pad pair. The motions of the three arms 3, 4 and 5, and the operation of the sewing machine 2 and shear press 6 are all interlocked and synchronized with one another by means of two major cam structures.

The first of these major cam structures is located in the showing of FIGURE 4 vertically centrally at the right-hand side thereof and consists of the large cam C2 and the two smaller cams C9 and C10, all of which are secured to a common cam shaft 60 for rotation therewith in fixed relationship one to another. The cam C10 controls the motion of the loading arm 3 by causing the cable 26 which is secured to the rear of the loading arm 3 by means of the clamp 25 to be moved in one direction or another. The cable 26 is seen to pass over the guide pulley 27 and down through the table 50 where its end is secured to a weight 28 which exerts a constant force on the arm 3 tending to move the arm rearwardly along the slide 24 into a retracted position. The cable 26 also extends forwardly around the guide pulley 29 and around the periphery of the larger sheave 30 of a ratio pulley secured for common rotation on the shaft 33 with a smaller sheave 32.

Secured to and wrapped about the periphery of the smaller sheave 32 is one end of a second cable 31, the other end of which is secured to a cam follower arm 34 which latter is pivoted at one end as at 35 and has attached to its other end its cam follower 36. As the cam follower 36 traces the periphery of the cam C10 the cam follower arm 34 oscillates about its pivot 35 being biased constantly toward the cam C10 by the weight 28 secured to the one end of the cable 26. Thus, the weight 28 tends to maintain the loading arm 3 in its retracted position and the cam C10 acting through the cam follower and cable structure moves the loading arm forward by overcoming the retracting force exerted by the weight 28.

The cam C9 controls the motion of the unloading arm 5 in a similar fashion. This cam operates upon a cam follower 43 secured to one end of the cam follower arm 41 which has its other end pivoted as at 42. Secured to the cam follower arm 41 is a cable 36 which extends downwardly and toward the left about a guide pulley 40 and across to the unloading arm 5 to which it is secured as at 37. From the tie point 37, the cable 36 extends to the left and passes downward around a guide pulley 38 secured to the table 50 and terminates at the weight 39. Thus, the weight 39 constantly urges the unloading arm 5 toward its left-hand position and the cam C9 acting through the cam follower and cable structure moves the unloading arm 5 toward the right by overcoming the bias due to the counterweight 39. Although not visible, the unloading arm 5 is pivoted for oscillating motion in a horizontal plane about a point located in the vicinity of the solenoid L2 mounted on the unloading arm 5.

While it is now understood that the loading arm 3 reciprocates along a straight line and that the unloading arm 5 oscillates about a pivot point, the sewing arm 4 is provided with an entirely different motion which actually constitutes the combination of two individual motions, one of which is a left to right generally rectilinear oscillatory motion and the other of which is a pivotal motion transverse to the direction of the reciprocating motion. These combined motions are required in order to produce the contour of the stitching pattern illustrated in FIGURE 3. The rectilinear reciprocating motion of the sewing arm 4 is provided by the large cam C2 which rotates on the common shaft 60 with the cams C9 and C10 which have already been described. The right-hand end of the sewing arm 4 is pivotally connected as at 67 to the slider 18 which latter mounts the cam follower 20 seen to be in engagement with the edge of the cam C2. The slider 18 rides in the slide guides 19 and is biased toward the right to maintain the cam follower 20 in engagement with the cam C2 by means of the cable 21 passing downward around the guide pulley 22 and secured to the counterweight 23 located beneath the table 50. As the cam C2 rotates, the slide 18 reciprocates left and right in its slide guides and transmits its motion to the sewing arm 4.

The second motion imparted to the sewing arm 4 is produced by the elongated cam C1 located approximately midway below the center of the sewing arm 4 on the showings of FIGURES 4 and 5A. Cam C1 acts upon the arm 4 through the agency of the cam follower 14 mounted upon the slider 12 which reciprocates in the slide guides 13 and which is provided with a sliding pivot 66 visible in the showing of FIGURE 5A. As will be subsequently most clearly seen from the to be described FIGURES 6 and 7 the pivot 66 shifts the sewing arm 4 by bearing against the side walls thereof but at the same time allows the arm 4 to shift left and right relative to the pivot 66. This arrangement is required so that the motion imparted to the sewing arm 4 by the cam C2 may be allowed to take place. As in the case of the slider 18, the slider 12 is biased toward the cam C1 by means of a cable 15 secured at one of its ends to the slider 12 and at its other end to a counterweight 17.

As also best seen in the showing of FIGURE 5A, secured to the cam C1 and rotatable therewith is a circular disc 74 having formed on its top surface a plurality of additional cams C3 through C8 which are positioned to actuate three switches S8, S9 and S10 mounted on a superstructure 56. These cams and switches provide timed control functions at predetermined parts of the operating cycle in a manner and for the purposes to be described subsequently. The cam C1 and cam carrying disc 74 are mounted upon a common shaft 68 (visible in the showing of FIGURE 6) for simultaneous rotation. Also secured to the cam shaft 68 is another cam C11 which controls the actuation of an air valve 49 also mounted on the superstructure 56 with the switches S8, S9 and S10.

The cam shafts 60 and 68, upon which are mounted for rotation the cams C1 through C11, are fitted respectively with identical sprockets 11 and 10 about which are trained a driving chain 9 coupled to a driving motor 7 through a speed reducer 8. Thus, the cam shafts are rotated synchronously and at the same number of revolutions per minute.

Each of the working arms 3, 4 and 5 is fitted at its working end with a clamp which is automatically opened and closed at the proper point in the cycle for the purposes of transferring the pad from one arm to another. The details of the pad transfer cycle will be subsequently described, it being sufficient at this point to indicate the gross structures involved. The loading arm 3 is fitted at its end with a loading clamp 44 which is raised and lowered under the control of the solenoid L1 mounted immediately to the rear thereof, the solenoid L1 being actuated by other elements of the apparatus. The unloading arm 5 is fitted with a crescent shaped unloading clamp 57 which is raised and lowered by the cable 59 acted upon by the solenoid L2 mounted at the pivoted end of the unloading arm 5, the solenoid L2 being operated at the appropriate time by other elements of the apparatus. It should be noted that the crescent shaped unloading clamp 57 extends beyond the left-hand edge of the pad about to be sheared by the shear press 6, this being required so that the pad may be completely cut in half while clamped with the unloading clamp 57 disposed in non-interfering position relative to the blade of the shear press 6.

The sewing arm clamp 45 is mounted at right-angles to and carried by an extension 52 which is reciprocable relative to and along the axis of the sewing arm 4. The reciprocation of the extension 52 is effected by the air cylinder 53 which is in turn connected to a solenoid controlled air valve L5 by means of the air hose 54. The solenoid controlled air valve L5 is actuated at the proper times during the stitching cycle and effects the zig-zag pattern of each of the jump stitch sequences J1 through J4 illustrated in the showing of FIGURE 1. The sewing clamp 45 is opened and closed by means of an air cylinder 46 mounted on the bracket 75, the actuation of this air cylinder 46 being carried out at the proper time by means of the air valve 49 under the control of the cam C11 mounted on the cam shaft 68. The air cylinder 46 is connected to the air valve 49 by means of an air hose 47, and the air valve 49 and solenoid controlled air valve L5 are respectively connected to a source 51 of pressurized air by means of the air hoses 48 and 55.

The shear press 6 is of the conventional type having a fly wheel 64 continuously rotated by a driving motor 62 by means of a belt drive 63 and being coupled to the cutting blade by means of an escapement controlled by the actuation of a solenoid L3'. Also illustrated in the showing of FIGURE 4 is a thread cutter 65 which may be of any convenient type but for purposes of illustration may be considered to be spring biased open and actuated for cutting the thread by means of the solenoid L3. In operation the solenoids L3 and L3' of the thread cutter and shear press respectively are most conveniently simultaneously actuated to cut the sewing machine thread and shear the pad all in one operation.

The sewing machine driving motor 61 is also a continuously running device but is only enabled to drive the sewing machine 2 when so permitted by the solenoid L4 which controls the engagement and disengagement of a clutch mechanism for selectively coupling and decoupling the stitching mechanism of the sewing machine 2 to the driving motor 61. Cam C12 located at the rear of the sewing machine 2 is secured to the spindle shaft thereof and closes switch S11 each time the sewing machine needle is in a particular position and is part of the circut which controls the stitching of the zig-zag pattern of the jump stitch sequences. Understanding now the general organization of the apparatus, attention may now be turned to the detailed structural showings of FIGURES 6 through 21.

III. MECHANICAL STRUCTURES—FIGURES 6 TO 21

Sewing Arm—FIGURES 6 to 13

Figures 6, 7, 8, 9, 14, 15, 16:
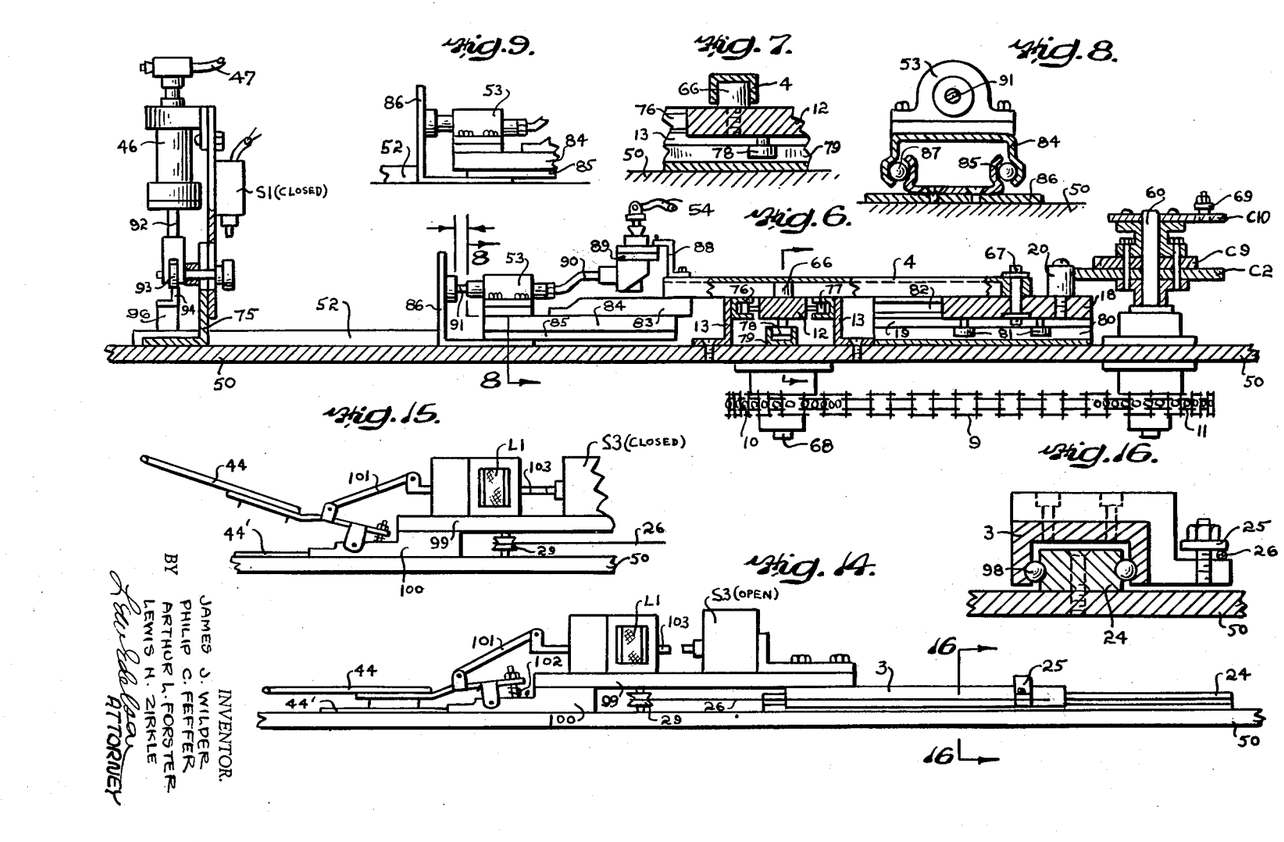
FIGURE 6 is a sectional view through the sewing arm and part of the driving cam structure as would be seen when viewed along the lines 6—6 of FIGURE 4.
FIGURES 7 and 8 are sectional views taken through the sewing arm of FIGURE 6 and as would be viewed when seen along the lines 7—7 and 8—8 of FIGURE 6.
FIGURE 9 is a fragmentary side elevational view of a portion of the arm illustrated in FIGURE 6 which shows the change in arm position brought about by actuation of an air cylinder mounted thereon.
FIGURE 14 is a side elevational view of the loading arm as would be seen when viewed along the lines 14—14 of FIGURE 4, and is shown with the loading clamp at one end of the arm in closed or clamping position.
FIGURE 15 is a fragmentary side elevational view showing the loading clamp of the arm illustrated in FIGURE 14 but in unclamping or open position.
FIGURE 16 is a sectional view taken through the loading arm of FIGURE 14 as viewed along the lines 16—16 of that figure.

FIGURE 6 shows certain details of the sewing arm which are not readily apparent from the showings of either FIGURE 4 or FIGURE 5A and it is these details which will be now described. The slide guides 13 which are secured to the table 50 are seen to include a pair of inwardly facing U-shaped channels 76 within which are disposed a plurality of rollers 77, which latter are secured to the slider 12 itself. Similarly, underlying the slider 12 and extending parallel thereto is an upwardly facing U-shaped channel 79 secured to the table 50 and within which is disposed the slide element 78 also secured to the slider 12. The slider 18 pivotally connected to the sewing arm 4 by the pivot pin 67 is observed to be similarly constructed, having a bottom slide guide 80 within which are disposed the downwardly projecting slide elements 81 secured at their upper ends to the slider 18, and also visible are the side slide guides 82 within which are disposed the lateral slide elements for the slider 18 but which are not visible in this showing.

Secured to the fore end of the sewing arm 4 on its undersurface is a bracket 83 which in turn has secured to its undersurface one-half of a ball bearing slider assembly 84, the latter in turn having secured to its forward end the air cylinder 53. Also secured to the forward end of the sewing arm 4 by means of a bracket 88 is a quick dump valve 89 which receives pressurized air from the solenoid operated air valve L5 through the air hose 54 and which transmits this pressurized air to the air cylinder 53 by means of the air conduit 90. The ball bearing slide element 84 which is supported by the bracket 83 secured to the forward end of the sewing arm 4 is slidably engaged with an underlying ball bearing bracket 85 through the medium of a plurality of ball bearings 87, this construction being clearly seen in the cross-sectional view of FIGURE 8.

Fixedly secured to the underside of the slide element 85 is the horizontally extending portion of an angle bracket 86, the vertically extending portion of this same angle bracket 86 being fixedly secured to the sewing-clamp-carrying fore-portion 52 of the sewing arm. The plunger 91 of the air cylinder 53 is also fixedly secured to the vertically extending portion of the angle bracket 86 so that when the air cylinder receives air through the conduit line 90 the angle member 86 is forced forward and carries the sewing clamp with it. Thus, the shoulder pad held by the sewing clamp 45 is rapidly shifted a predetermined distance to the left so that a stitch made at that time by the sewing machine needle will lie to the right of a stitch made by the sewing machine needle when the air cylinder plunger 91 has not been extended. It is through this mechanism that the zig-zag pattern of stitching illustrated in the showing of FIGURE 1 is laid down. The low friction bearing slide including the slide elements 84 and 85 and the ball bearings 87 provides a low friction sliding support for the sewing clamp and supporting assembly, thus, relieving mechanical strain on the air cylinder plunger 91. A spring built into the air cylinder 53 causes the plunger 91 to retract when pressure thereupon is released and this condition is illustrated in the fragmentary view of FIGURE 9.

The quick dump valve 89 is incorporated in the air circuit of the air cylinder 53 to provide a quick release of the air pressure acting on the plunger 91 when the solenoid air valve L5 closes in order to effect rapid retraction of the sewing clamp structure. This rapid retraction of the air cylinder plunger 91 is desired so that the next stitch made by the sewing machine 2 is made to the left of the stitch formed when the air cylinder plunger was extended. The jump stitch sequences are all formed by this mechanism wherein alternate stitches are taken with the air cylinder plunger extended and the intermediate stitches are taken with the air cylinder retracted.

Figures 10, 11, 12, 13, 17, 21:
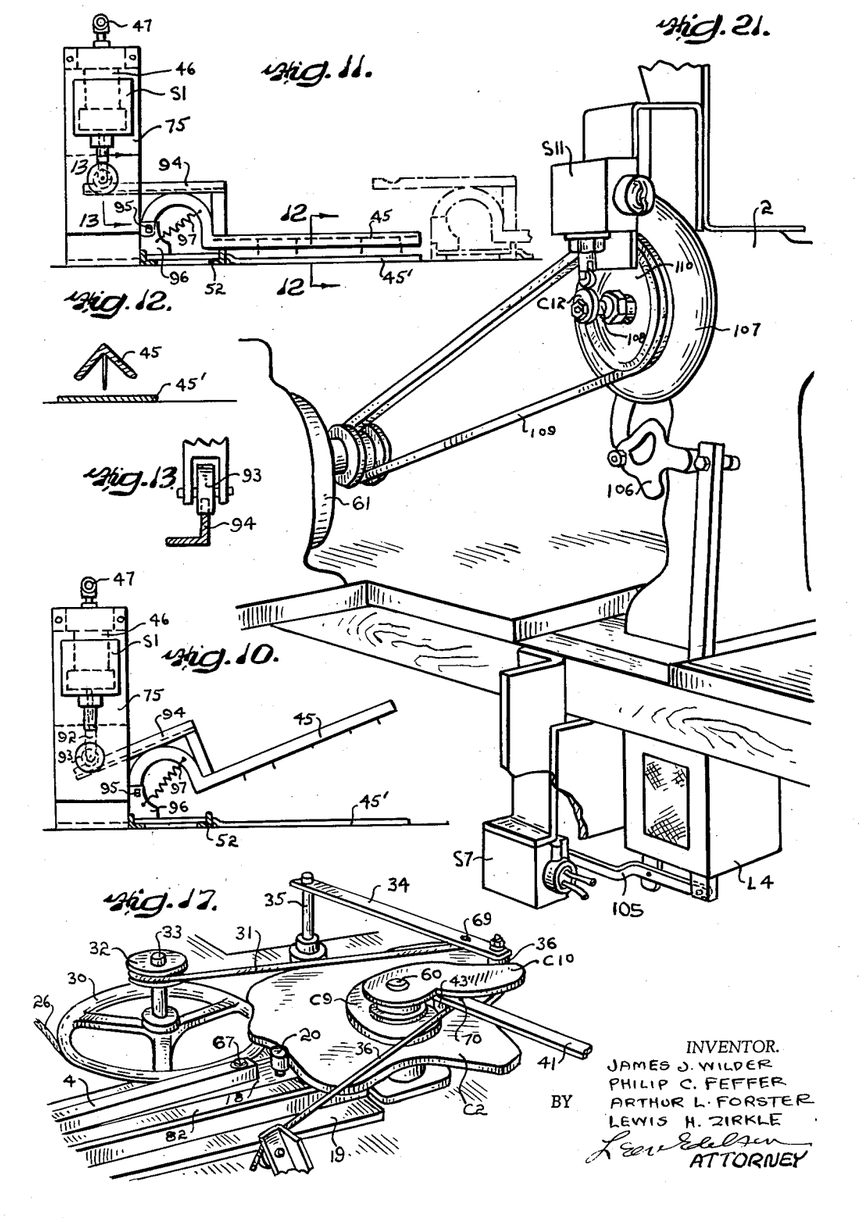
FIGURE 10 is a side elevational view of the sewing clamp attached to the end of the sewing arm seen in FIGURE 6 and taken at right angles to the sewing arm as would be viewed along the lines 10—10 of FIGURE 4; also seen in this view is the air cylinder illustrated in position opening the sewing clamp.
FIGURE 11 is similar to the showing of FIGURE 10 except that it illustrates the air cylinder in retracted position so that the sewing clamp is shown in closed or pad clamping position.
FIGURES 12 and 13 are sectional views taken along the lines 12—12 and 13—13 of FIGURE 11.
FIGURE 17 is an enlarged perspective view of one of the cam structures employed to impart coordinated motions to the structure illustrated in FIGURE 4.
FIGURE 21 is a perspective view of the rear of the sewing machine structure illustrated in plan in FIGURE 4 as would be seen when viewed along the lines 21—21 of that figure.

Situated at the left-hand end of FIGURE 6 immediately adjacent the sewing clamp 45 is the bracket 75 secured to the table 50 and upon which are mounted the air cylinder 46 and the switch S1. The air cylinder 46 includes a plunger 92 illustrated in the showing of FIGURE 6 in downward extended position which corresponds to its state when the air cylinder is being supplied with pressurized air through the hose line 47. Secured to the end of the plunger 92 is a roller 93 seated upon an underlying horizontally extending member 94 which comprises part of the structure of the sewing clamp 45. In the condition shown in the showing of FIGURE 6 and as also seen in the showing of FIGURE 10, the extended plunger 92 of the air cylinder 46 causes the sewing clamp to be opened by pivoting the latter about the pivot 95 located at the curved end of the sewing clamp 45 which lies above the sewing arm extension 52. The pivotal support is supplied by the bracket 96 which is rigidly secured to the extension 52 of the sewing arm 4. The extension spring 97 secured at its opposite ends to the bracket 96 and sewing clamp 45 maintains the sewing clamp in a closed position, as illustrated in the showing of FIGURE 11, when the plunger 92 of the air cylinder 46 is in its retracted position. As also seen in the showing of FIGURE 6 the switch S1 mounted on the bracket 75 with the air cylinder 46 is operated by the plunger of the air cylinder, and as shown is in its closed position when the plunger 92 is extended. Finally, as best seen in the showings of FIGURES 10, 11 and 12, a sole plate 45' is secured to the sewing arm extension 52 and extends outwardly therefrom beneath the sewing clamp 45.

Loading Arm—FIGURES 14, 15 and 16

FIGURE 14 illustrates the loading arm 3 in side elevation on the table 50 and with the loading clamp 44 in its down or closed position. It is observed that secured to the front end of the loading arm portion 3 is an extension arm 99 which bridges forward to an underlying bracket 100 which carries the sole plate 44' of the loading clamp. Secured to the bridging portion 99 are the solenoid L1 and switch S3. A pivoted linkage 101 couples the loading clamp 44 to the plunger 103 of the solenoid L1 so that when the solenoid is energized the loading clamp 44 may be pivoted open as illustrated in the fragmentary showing of FIGURE 15, in which latter figure it will also be observed that the solenoid plunger 103 in addition to opening the loading clamp 44 also closes switch S3. Deenergization of the solenoid L1 causes the loading clamp 44 to be depressed into its closed position under the urging of the compression spring 102, simultaneously, of course, opening the switch S3 by reason of the disengagement therefrom of the solenoid plunger 103. FIGURE 16 most clearly shows the ball bearing slide construction of the arm 3 and fixed position slide guide 24, these two elements being slidable relative to one another through the medium of the ball bearings 98.

Cam Structures FIGURES 17 to 21

Figures 18, 19:
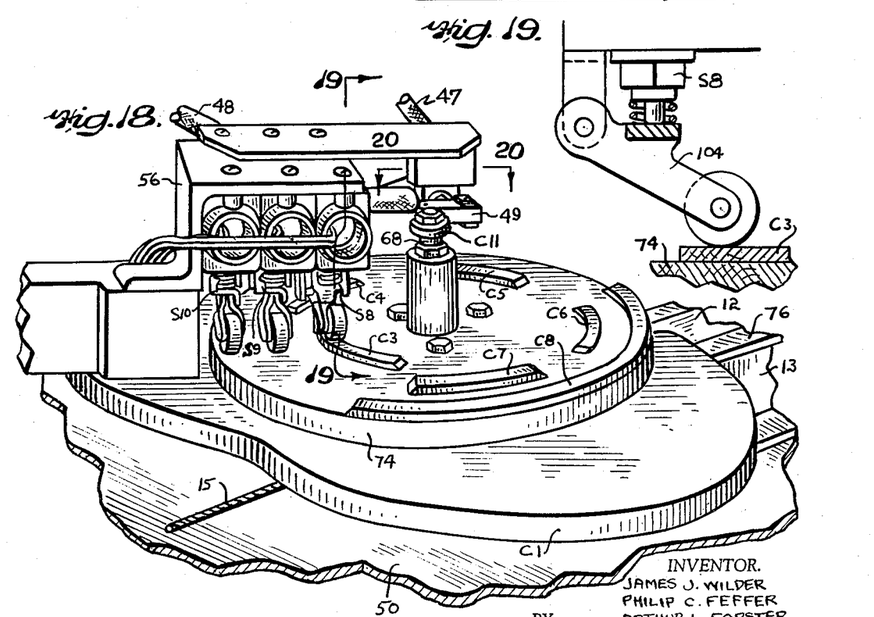
FIGURE 18 is an enlarged perspective view of the other major cam structure illustrated in the showing of FIGURE 4 for imparting a particular motion to the sewing arm and for actuating certain switches.
FIGURE 19 is a fragmentary view taken along the lines 19—19 of FIGURE 18 illustrating the cam actuation of the one of the switches shown thereon, some parts being shown in section and others in elevation.

FIGURE 17 illustrates in enlarged perspective fragmentary view that portion of the apparatus located in the region of the cams C2, C9 and C10 and all elements shown thereon have been previously described in connection with the showings of FIGURES 4 and 5A. The fragmentary enlarged perspective showing of FIGURE 18 makes clear the cam structures and cooperating switches shown in FIGURES 4 and 5A described as being located approximately centrally and below the sewing arm 4. From FIGURE 18 it may be seen that the cams located on the circular cam disc 74 are arranged on three concentric circles, the cam C8 lying along the circle of largest diameter and the cam C3 lying along the circle of smallest diameter, whereas the four cams C4, C5, C6 and C7 are all spaced along the periphery of the circle of intermediate diameter. The switch S8 shown in the view of FIGURE 19 is illustrated in its closed position as brought about by the roller linkage 104 when the latter is riding upon the cam C3. The switch S9 is seen to be similarly operable in relation to the cams C4 through C7, as likewise is the switch S10 when engaged with the cam C8.

Figures 5B, 5C, 20:
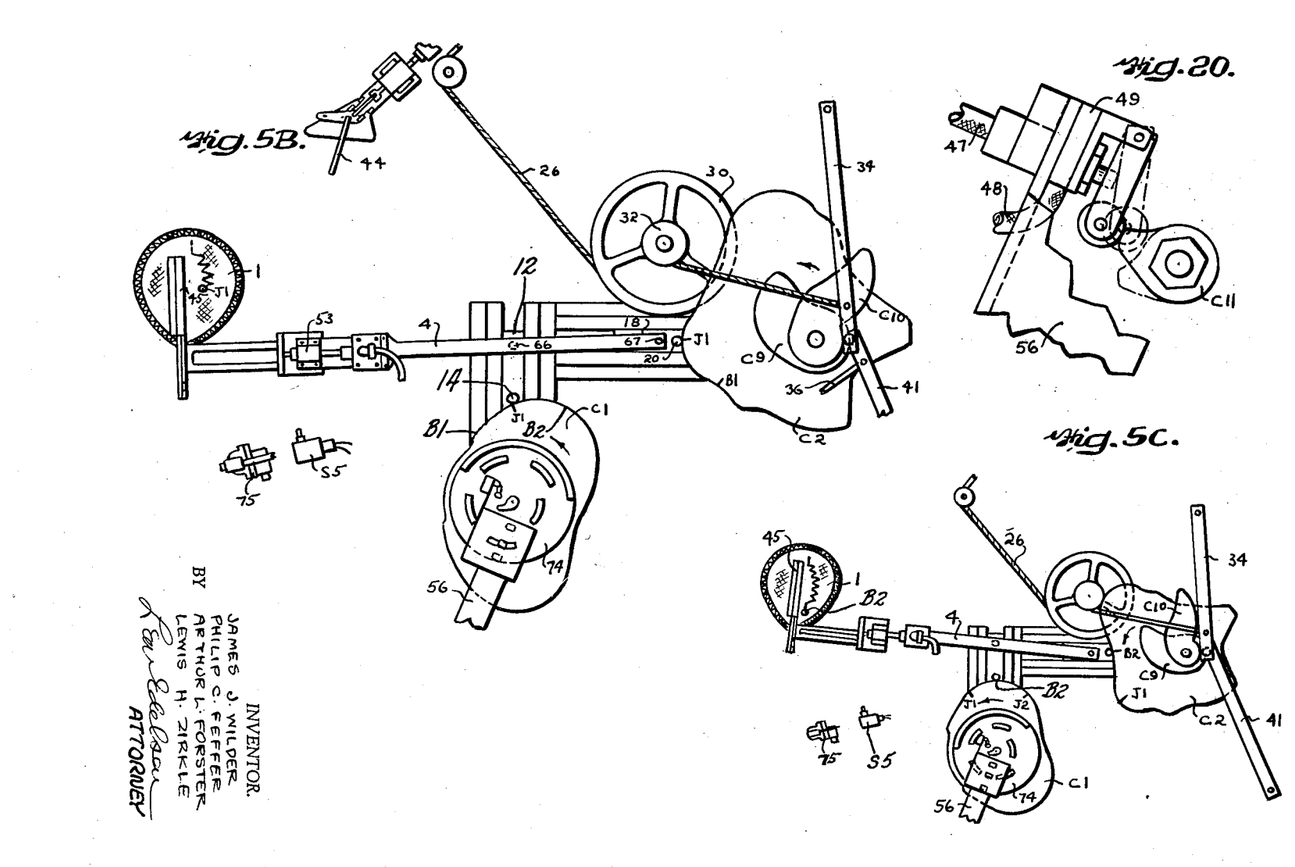
FIGURE 20 is a fragmentary plan view of the cam operated air valve which is part of a structure illustrated in FIGURE 18 and as would be seen when viewed along the lines 20—20 of that figure.

Also seen in FIGURE 18 and in the enlarged fragmentary view of FIGURE 20 are the cam C11 mounted upon the cam shaft 68 and the air valve 49 secured to the superstructure 55. From the illustrated configuration it will be readily understood that the air valve 49 is actuated by the cam C11 only once for each complete revolution of the cam shaft 68 and hence, of course, only once during each cycle of operation. Since it is the air valve 49 which controls the opening of the sewing clamp 45, it follows that cam C11 actuates the air valve 49 at that point in the operating cycle wherein it is desired to open the sewing clamp for removal of the just stitched pad and so that a new unstitched pad may be positioned under the clamp.

Turning now to the fragmentary perspective showing of FIGURE 21 which illustrates the rear of the sewing machine 2, it will be observed that the sewing machine motor 61 is coupled to and continuously drives one-half of a clutch mechanism 110 by means of the drive belt 109. The clutch half 110 is selectively coupled to the sewing machine spindle for driving the needle bar by means of the other half of the clutch mechanism located within the housing 107, and engagement and disengagement of the clutch assembly is controlled by the solenoid L4 through the linkage 106. The solenoid L4 also actuates the switch S7 through the linkage 105 so that the switch S7 is closed when the solenoid L4 is energized to effect declutching of the sewing machine spindle from the driving motor. The cam C12 is secured to a spindle shaft extension 108 so that the cam high point always bears a fixed relationship to the position of the needle bar of the sewing machine, and hence, this cam C12 will always actuate the switch S11 at a time fixedly related to the position of the sewing machine needle. This fixed relationship is important because the switch S11 is an element of the control circuit which produces the zig-zag stitching pattern of the jump stitch sequences.

IV. TRANSPORTATION CYCLE, GROSS ARM MOTIONS—FIGURES 4, 5A

This section sets forth the various motions of each of the operating arms of the apparatus in relationship to the timing marks indicated on the cams C1 and C2 of FIGURE 5A. In this way, the motions of all three arms may be readily established at any particular time. Since the timing marks are only indicated on the showing of FIGURE 5A, and further since all three of the operating arms are only seen in the showing of FIGURE 4, it is necessary to refer to both of these figures. The timing marks appearing on the cams C1 and C2 of FIGURE 5A are seen to be B1 through B4 and J1 through J4 in alternation plus the two marks SC and SMS located between J4 and B1. The marks B1 through B4 and J1 through J4 correspond to approximately the mid point of the box stitch and jump stitch sequences as illustrated in the showings of FIGURES 1 and 3. The mark SC indicates the point in the cycle where sewing has been completed and the mark SMS indicates the immediately following portion of the cycle wherein the sewing machine is stopped. Obviously, the SC and SMS marks must occur in that portion of the operating cycle between the end of stitching of one pad and the beginning of stitching of the next pad so that the transfer of shoulder pads from arm to arm will occur during this interval. This transfer cycle will be completely described in the next section, this section setting forth only the relative motions of the arms during a complete cycle of operation without regard to the actuation of the loading clamp, sewing clamp and unloading clamp which are necessarily involved in the transfer from one arm to another of the stitched and next successive unstitched shoulder pad.

At the end of the J4 sequence the sewing arm moves to the rest position and remains there until just before the beginning of B1 on the next cycle. While the sewing arm is at the rest position the unloading arm 5 removes the stitched pad and immediately thereafter a new pad is received by the sewing arm 4 from the loading arm 3. Between B1 and J4 the sewing arm moves away from its rest position and carries the pad under the needle of the sewing machine 2 where the pad is stitched. The unloading arm 5 sits motionless at the shear press 6 between SMS and approximately the middle of the J3 sequence at which time it begins moving steadily toward the sewing arm rest position where it arrives toward the end of J4. Right after J4 when the sewing arm has arrived at its rest position the unloading arm picks up the stitched pad and moves quickly to the shear press 6 where the pad is cut at SMS, the unloading arm then remaining at the shear press until the middle of J3 of the next cycle.

Between B1 and B4 of a given cycle the loading arm 3 sits motionless in its retracted position at the loading station to receive an unstitched pad for transportation to the sewing arm upon completion of the pad then being stitched. Between B4 and J4 the loading arm starts moving forward slowly toward the rest position of the sewing arm. Between the end of J4 and SMS the loading arm moves forward rapidly the remaining distance to the sewing arm rest position and places the unstitched pad in position to be received by the sewing arm clamp, the final positioning under the sewing clamp following immediately upon removal of the stitched pad by the unloading arm. Thereafter between SMS and B1 the loading arm rapidly retracts to the loading station so that it is in position to receive the next unstitched pad.

From the foregoing it is seen that the integrated arm motions may be considered generally, although not exactly, to follow a sequence wherein during actual pad stitching by the sewing arm the loading arm and unloading arm are positioned generally away from the sewing arm rest position and are themselves substantially at rest, whereas upon completion of stitching and retraction of the sewing arm to its rest position the loading arm and unloading arm both move in toward the sewing arm rest position where a rapid transfer of stitched and unstitched pads is effected between the arms followed by rapid retraction of the loading and unloading arms and the initiation of stitching on the new unstitched pad. The arm motions just described are effected by means of the cams C1, C2, C9 and C10 and their linkages with the operating arms.

V. ARM TO ARM PAD TRANSFER SEQUENCE—FIGURES 4, 5A, 22

Figure 22:
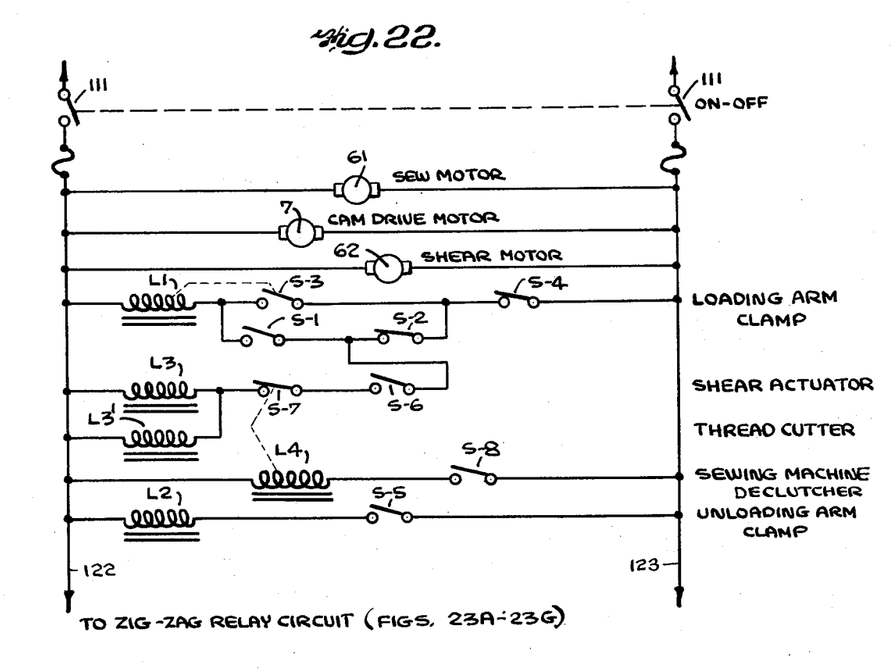
FIGURE 22 is an electrical schematic diagram which illustrates the circuit configuration of certain of the solenoids and switches illustrated in various of the other figures.

Referring now to FIGURE 22 in addition to FIGURES 4 and 5A and assuming that the main power switch 111 is closed so that the cam drive motor 7, sew motor 61, and shear motor 62 are all energized and running, and further assuming that the cam followers 14 and 20 have not quite reached the B4 timing marks on the cams C1 and C2, the loading arm 3 is in retracted position with the loading clamp 44 open and with an unstitched pad resting on the loading clamp sole plate 44'. At this time the maximum radius of the cam C2 (at about the timing mark J2 on cam C2) rides past and momentarily opens the normally closed switch S4 deenergizing solenoid L1 which was previously energized through the holding circuit provided by switch S3, causing the loading clamp 44 to drop and grasp the unstitched pad. At B4, as previously described, the loading arm 3 begins to move toward the sewing arm rest position carrying with it the unstitched pad in the loading clamp. At the end of J4, the unloading arm 5 is at the sewing arm rest position with the unloading clamp 57 open.

When the sewing arm 4 retracts to the rest position it closes switch S5, energizing solenoid L2 and closing unloading clamp 57 on the stitched pad. Immediately thereafter, cam C11 on cam shaft 68 opens the air valve 49 which extends the plunger 92 of the air cylinder 46 and opens the sewing clamp 45. The unloading arm 5 removes the stitched pad and the loading arm 3 inserts a new pad. When the plunger 92 of the air cylinder 46 is extended to open the sewing clamp 45 it also simultaneously opens switch S1 preventing the loading clamp 44 from opening by preventing solenoid L1 from being energized through the switch S2 which had closed when the loading arm 3 moved forward. Cam C11 which has continued to revolve on the cam shaft 68 now rides past and closes the air valve 49, thus, removing the air pressure from the plunger of air cylinder 46 and allowing it to retract. Retraction of the plunger 92 of air cylinder 46 allows the sewing clamp 45 to drop on the unstitched pad held by the loading clamp, and, at the same time close the switch S1 which energizes solenoid L1 and opens the loading clamp 44. Energization of the solenoid L1 causes the plunger 103 thereof to close switch S3 and establish a holding circuit through now closed switch S4 to maintain the solenoid L1 in an energized state to hold the loading clamp 44 in its open position even after retraction of the loading arm 3 has caused the switch S2 to open.

During the time interval between SC at the end of one cycle and the beginning of B1 of the next cycle the switch S8 is closed by cam C3 on the cam disc 74 thereby energizing solenoid L4 which declutches the sewing machine from the motor drive 61 and also closes switch S7. When the unloading arm 5 removes the stitched pad to the shear press 6 it thereby closes the switch S6 which energizes the shear press escapement solenoid L3' and the thread cutter solenoid L3 through the circuit including switches S7, S6, S2 and S4, thus, cutting the thread and shearing the pad in half. When thereafter switch S8 runs off of cam C3 and is opened at the beginning of B1 on the next cycle, the solenoid L4 is deenergized and clutches in the stitching mechanism of the sewing machine 2 while also opening switch S7 so that the shear press cannot thereafter be operated. Also as the sewing arm moves away from its rest position at the beginning of B1 on the next cycle, the switch S5 opens deenergizing solenoid L2 and opening the unloading arm clamp 57. The foregoing cycle of operation repeats once during each successive complete cycle of machine operation.

VI. STITCHING PATTERN AND ZIG-ZAG CIRCUITS—FIGURES 1, 3, 23A–23G, 5A–5E

It will be recalled that the switch S8 under the control of the cam C3 mounted on the cam disc 74 inactivates the sewing machine 2 by declutching the sewing machine needle from the driving motor 61 during the time interval between the timing marks SC and B1 on the cams C1 and C2, and that during that time interval the interarm pad transfers occur. This section deals with the time interval between the timing marks B1 and SC (clockwise) which is that interval within which all of the stitching of the shoulder pad takes place. Consequently, it is the motions of the sewing clamp 45 which carries with it the pad 1 which will be here described. The elements involved in the stitching operation are the cams C1 and C2 which act upon the sewing arm 4 to provide the gross contouring of the stitching pattern, the solenoid air valve L5 and the air cylinder 53 which superimpose on the gross contour of the stitching pattern the zig-zag stitches of the jump stitch sequences, and the switches S9, S10 and S11 together with their controlling cams C4 through C8 and C12 which control the operations of the relay circuits illustrated in FIGURES 23A to 23G and which hence control the timed operation of the solenoid air valve L5 to produce the zig-zag pattern of the jump stitch sequences.

Referring first to FIGURE 1 and FIGURE 3, it will be observed that the dots designating the approximate midpoints of the jump stitch sequences J1, J2, J3 and J4 all lie along a path which may be considered to define the left-hand edge of a band within which each of the jump stitch sequences is disposed. In the showing of FIGURE 1 it will be observed that these paths include all of the zig-zag stitches which are designated by the small letter "r," whereas all of the zig-zag stitches designated by the small letter "e" are seen to be taken to the right of the stitches designated as "r." All of the zig-zag stitches designated by the small letter "r" are made when the plunger 91 of the air cylinder 53 carried by the sewing arm 4 is in its retracted position, whereas all of the stitches designated by the small letter "e" are made when the plunger 91 of the air cylinder 53 is in its extended position.

During the first half of the stitching pattern, which includes the first and second box stitch sequences B1 and B2, the first and second jump stitch sequences J1 and J2, and the solid line path shown in FIGURE 3 is produced solely by the contours of the cams C1 and C2 with the plunger 91 of the air cylinder 53 in its retracted position.

The zig-zag pattern of the jump stitch sequences J1 and J2 are produced by extending the plunger 91 at the appropriate times to shift the sewing clamp 45 and pad 1 to the left under the needle of the sewing machine, hence producing the pattern illustrated in the right-hand half of the showing of FIGURE 1.

However, this mode of operation is not employed in the second half of the stitching pattern which includes the box stitch and jump stitch sequences B3, J3, B4 and J4. During this second half of the stitching pattern the solid line path illustrated in FIGURE 3 is the result of what may be termed a base line shift. This base line shift is brought about by the actuation of the switch S10 by the cam C8 which causes the plunger 91 of the air cylinder 53 to extend and to remain extended except during the jump stitch sequences J3 and J4 when it is allowed to retract on alternate stitches. Thus, during the first half of the stitching pattern the switch S11 mounted on the sewing machine spindle is caused to pulse the relay control circuitry to extend the plunger of the air cylinder 53 while during the second half of the stitching pattern the switch S11 pulses the relay control circuitry to cause retraction of the plunger of the air cylinder 53.

This base line shift takes place between the end of the J2 sequence and the beginning of the B3 sequence and results in the solid line path of FIGURE 3 during the B3, B4 and SC portions of the second half of the stitching pattern instead of the dotted line paths 132, 133 and 134 which would be traced if the motion of the sewing clamp 45 were controlled solely by the contours of the cams C1 and C2. As is readily seen from the showing of FIGURE 3, the path of the dotted lines 132, 133 and 134 when combined with the intervening solid line paths of J3 and J4 constitutes a relatively smoothly changing contour since it does not encompass the sharp changes in direction which exist at both ends of the J3 and J4 sequences. Without the base line shift previously described, the contour of the cam C2 would have to provide the sharp changes required in the stitching pattern and difficulty could be encountered with the ability of the cam follower 20 to follow the sharply changing cam C2 contour. This problem is avoided by the incorporation of the base line shift just described during the second half of the stitching pattern.

Figure 23A:
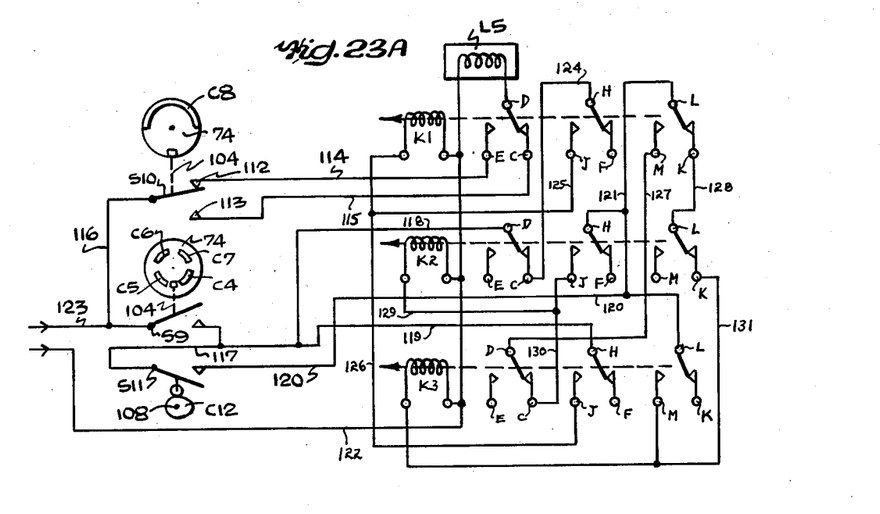
FIGURES 23A through 23G illustrate in schematic form the relay circuitry utilized to form the zig-zag stitching pattern seen in the showing of FIGURE 1, and includes the interconnections with certain of the apparatus switches and cam structures which control the operation of the relays.

Turning now to the showings of the control circuitry illustrated in FIGURES 23A to 23G and examining firstly the showing of FIGURE 23A, it will be observed that the switches S9 and S11 are single pole single throw switches whereas the switch S10 is a single pole double throw switch. Further, the switch S11 which is continuously opened and closed by the cam C12 affixed to the sewing machine spindle 108 during the entire time that the sewing machine 2 is in operation is only permitted to influence the relay circuitry when the switch S9 is closed.

The switch S9 is closed only during the time intervals during which the roller linkage 104 rides on top of the cams C4 through C7, the cams C4 and C5 corresponding respectively to the jump stitch sequences J1 and J2 and the cams C6 and C7 corresponding respectively to the jump stitch sequences J3 and J4. Just prior to engagement of the roller linkage 104 with the cam C4 and between the cams C4—C5, C5—C6 and C6—C7 the box stitch sequences B1 through B4 are taken. Thus, it is seen that during the box stitch sequences switch S9 is open and switch S11 is therefore prevented from causing the relay circuitry to produce the zig-zag pattern even though switch S11 is being constantly opened and closed by the cam C12.

Figure 23B:
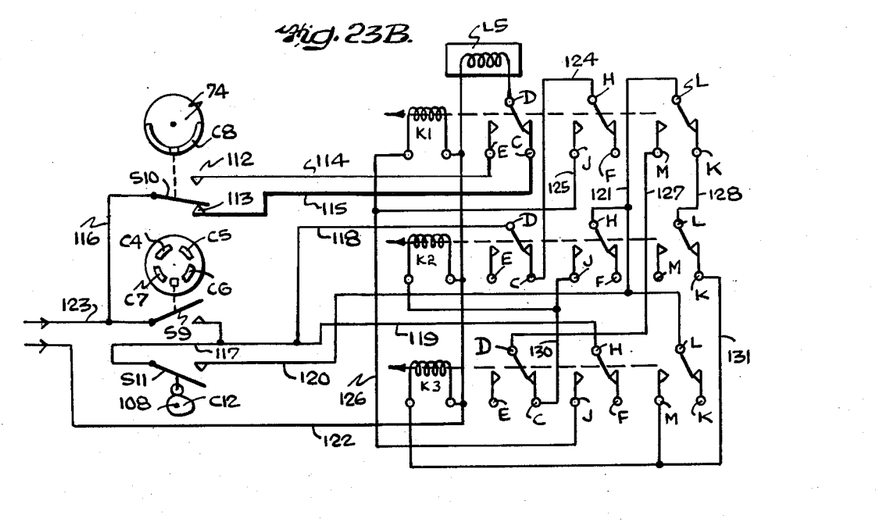

Also, it will be observed that during the time that switch S9 is under the control of cams C4 and C5, switch S10 is not engaged with the cam C8 so that the solenoid air valve L5 is deenergized and the plunger 91 of the air cylinder 53 will remain in its retracted position except when extended by the circuitry including switches S9 and S11. That this is so is readily seen from the fact that the pole of switch S10 is in contact with its contact 112 which connects via line 114 to an open contact E of relay K1 and hence the solenoid air valve L5 is not energized since the pole D of the relay K1 is not engaged with the contact E of the same relay. On the other hand, when cam C8 rotates in position to engage the roller linkage 104, the pole of the switch S10 is transferred to the contact 113 and hence current from the line 116 may pass therethrough and along line 115 to one side of the solenoid air valve L5 via the contact C and pole D of relay K1, returning via line 122 to the other side of the power line. Hence, as previously described, during the second half of the stitching pattern the air cylinder plunger 91 will normally be extended except at those times dictated by the combined effect of the switches S9 and S11. This transferred condition of the pole of switch S10 as caused by the action of the cam C8 is illustrated in the showing of FIGURE 23B wherein the normally energized circuit of the solenoid air valve L5 is illustrated by the heavy line.

Figure 23C:
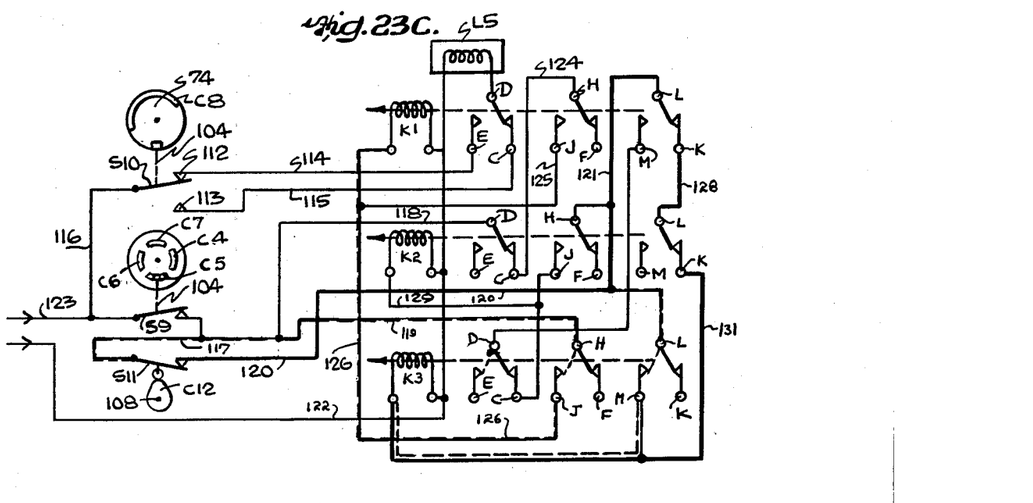

Assume now that the conditions illustrated in FIGURE 23A shift to those illustrated in FIGURE 23C due to the fact that the roller linkage 104 connected to the switch S9 rides up onto the cam C5 and thus closes switch S9. When thereafter the pulse switch S11 is closed by cam C12, relay K3 is energized over the circuit traceable from the incoming line 123 through now closed switches S9 and S11, over lines 120 and 121 and through the pole and contact L and K of relay K1, over line 128, through the pole and contact L and K of relay K2 to line 131 and thence through the winding of the relay K3 back to the other power line 122. This path is shown in the heavy black line of FIGURE 23C.

Figure 23D:
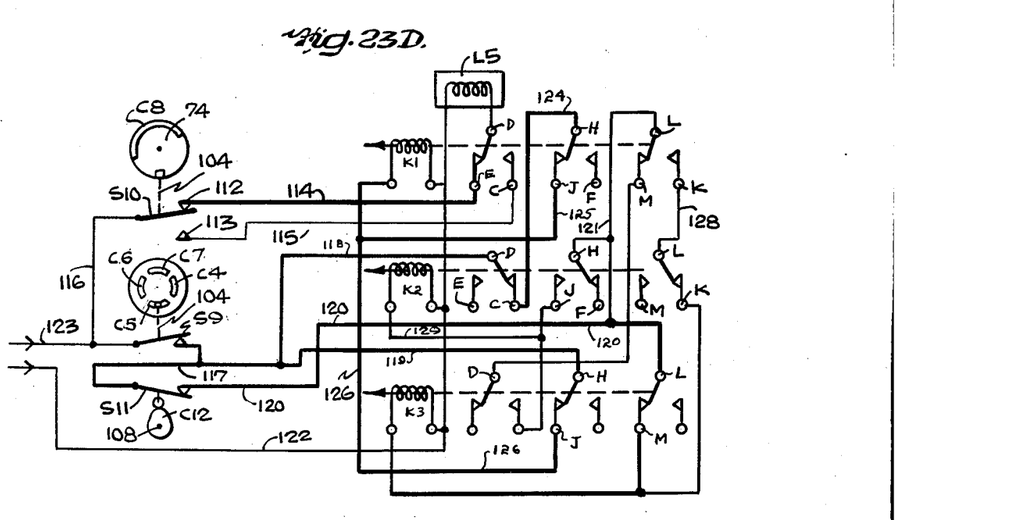

The poles of relay K3 now transfer as indicated by the dotted lines and a holding circuit is established through the pole and contact L and M of relay K3. Transfer of the pole H to the contact J of the relay K3 results in the energization of relay K1 over the path from switch S9 including the lines 117, 119 and 126 to the coil of relay K1, and thence through the coil and back to the main power line 122. The poles of relay K1 transfer as illustrated in the showing of FIGURE 23D and a holding circuit is established through pole and contact H and J of relay K1, pole and contact D and C of relay K2 and the lines 118, 124, and 125 from switch S9 and thence back to the main power line 122 through the coil of the relay K1. The pole D of relay K1 being now transferred into engagement with its contact E energizes the solenoid air valve L5 through line 114 and contact 112 of switch S10. The plunger 91 of air cylinder 53 is thus extended and moves the pad laterally under the sewing machine needle.

Figure 23E:
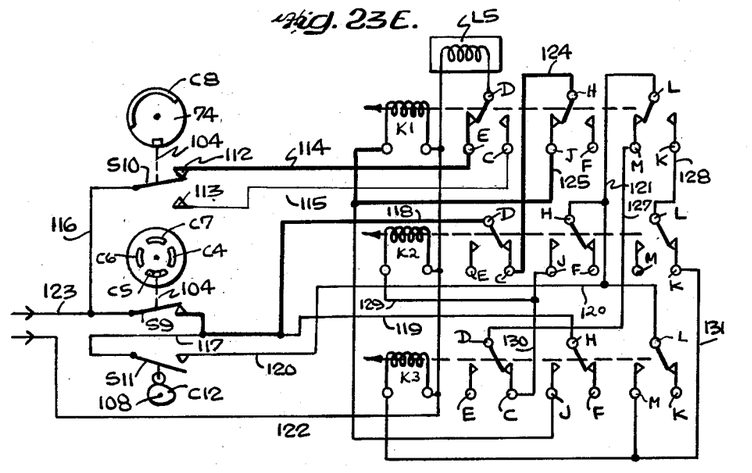
Figure 23F:
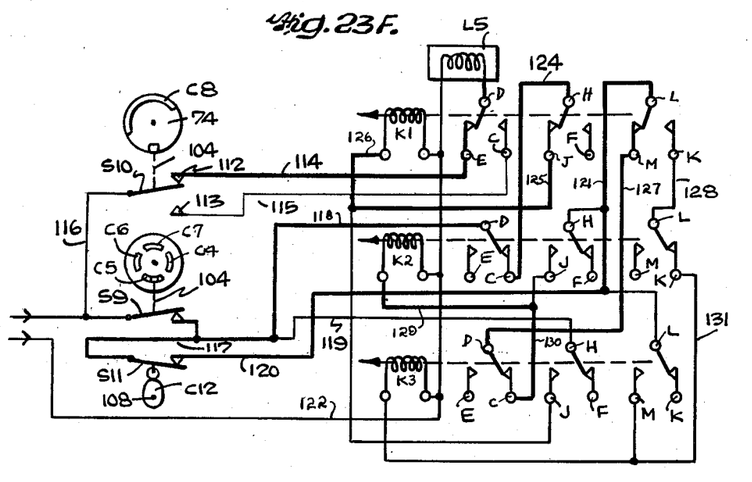
Figure 23G:
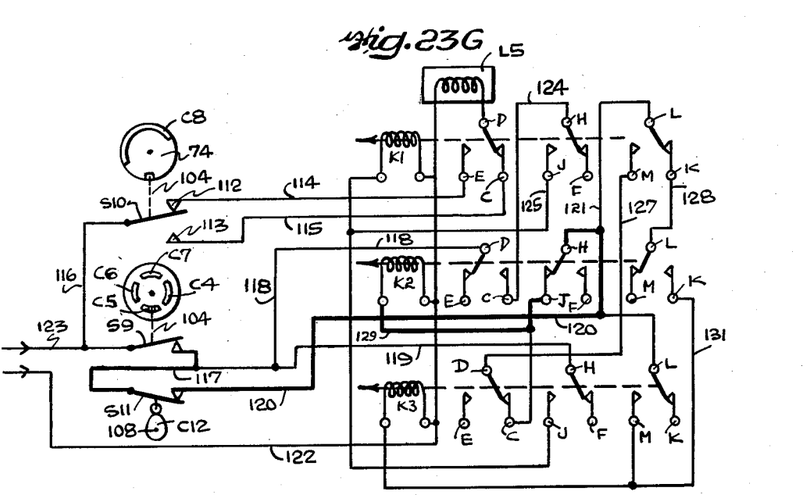

After this stitch is made cam C12 allows switch S11 to open, as seen in FIGURE 23E, which deenergizes relay K3 by breaking the circuit to line 120. Relay K1 remains locked in due to the action of its holding circuit established through pole H and contact J of relay K1 as previously described. When now cam C12 again closes pulse switch S11 prior to the taking of the next stitch, relay K2 becomes energized by current flowing along the path from switch S11 and over lines 120 and 121, through the pole and contact L and M of relay K1 along line 127 and through the pole and contact D and C of relay K3 to lines 130 and 129 to the coil of the relay K2, the circuit return being made as usual to the main power line 122. Relay K2 becomes locked in by means of the holding circuit through its pole H and contact J. The holding circuit through the pole and contact H and J of relay K1 is thus broken when pole D of relay K2 disengages from contact C. The deenergization of relay K1 causes the pole D thereof to break contact with its associated contact E and hence to deenergize the solenoid air valve L5 causing the plunger 91 of the air cylinder 53 to retract. Thus, the stitch made immediately following lies on the path determined by the contour of the cams C1 and C2. Upon the opening of switch S11 following this just taken stitch, relay K2 is deenergized and another complete cycle of relay operation begins.

From the foregoing description it should be now apparent that the plunger 91 of the air cylinder 53 is extended once for each two closings of the switch S11 and hence the stitch taken when the plunger 91 is extended occurs only on alternate stitches. The foregoing described cycle takes place during the jump stitch sequences J1 and J2. When the conditions of FIGURE 23B are subsequently established by the action of cam C8 on switch S10, the base line shift previously described takes place and may be now readily understood by reexamining the circuit conditions of FIGURES 23C through 23G but with the pole of switch S10 now in contact with its contact 113.

Figures 5D, 5E:
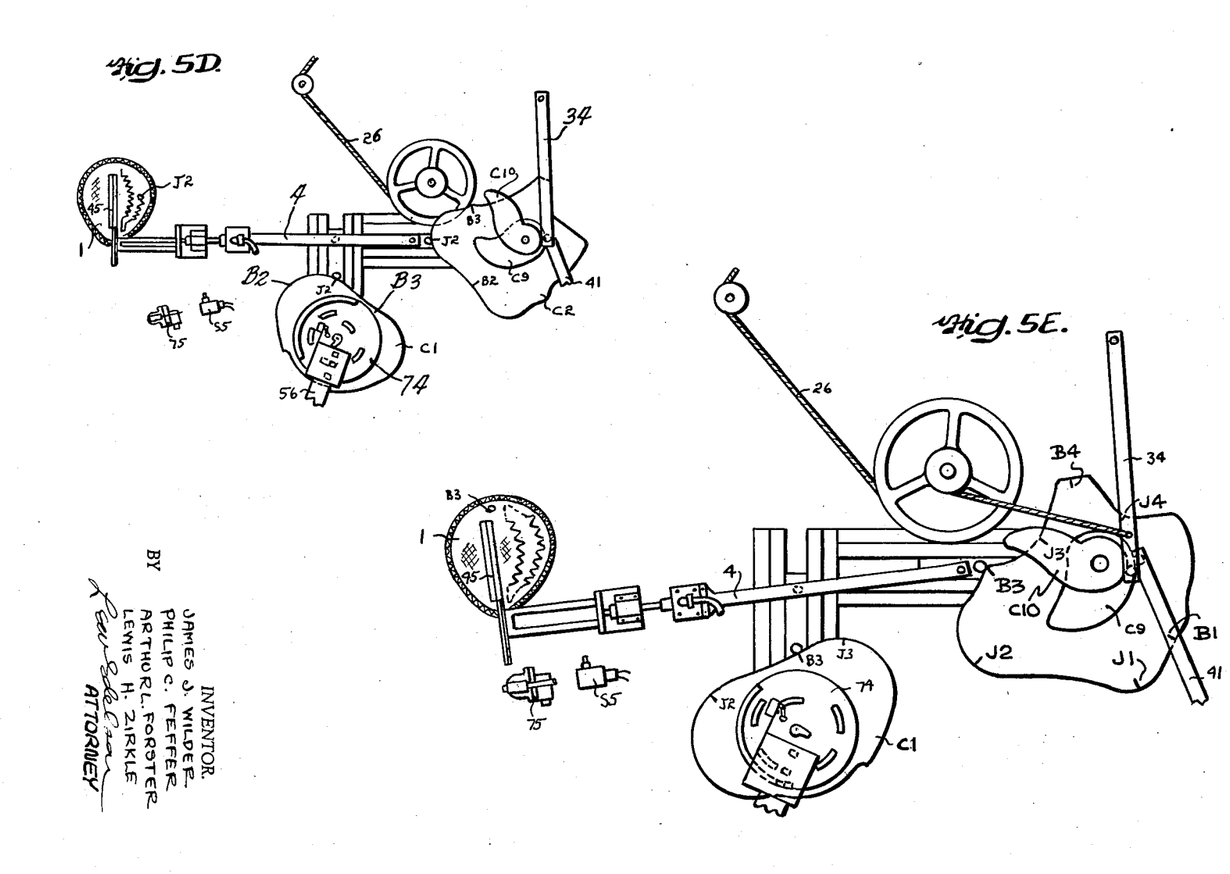

FIGURES 5A through 5E illustrates the relative positions of the various cams and the sewing arm 4 as a portion of the stitching pattern is run off. FIGURES 5A, 5C, and 5E respectively illustrate the box stitch sequences B1, B2 and B3, whereas FIGURES 5B and 5D illustrate respectively the jump stitch sequences J1 and J2.

Having now described our invention in connection with a particularly illustrated embodiment thereof, it will be appreciated that various changes and modifications will now occur from time to time to those persons normally skilled in the art without departing from the essential scope or spirit of our invention, and accordingly, it is intended to claim the same broadly as well as specifically as indicated by the appended claims.

What is claimed as new and useful is:

1. The method of making shoulder pads including the steps of, carrying an unstitched shoulder pad held in a sewing clamp from a rest position to a stitching mechanism, moving the sewing clamp under the needle of the stitching mechanism along a predetermined path to stitch the pad with a particular pattern, grasping a second unstitched pad with a loading clamp while the first pad is being stitched and moving the loading clamp and an unloading clamp toward the sewing clamp rest position, retracting the sewing clamp from the stitching mechanism to its rest position, grasping the stitched pad with the unloading clamp and releasing the pad from the sewing clamp, removing the stitched pad from the sewing clamp by retracting the unloading clamp and simultaneously placing the unstitched pad held by the loading clamp into the sewing clamp, grasping the second unstitched pad with the sewing clamp and releasing and retracting the loading clamp from the second unstitched pad, and repeating the foregoing steps continuously.

2. The method of making shoulder pads according to claim 1, including the additional step wherein the unloading clamp transports the stitched pad removed from the sewing clamp to a shearing mechanism while the second unstitched pad is being inserted in the sewing clamp by the loading clamp, and the step of shearing the stitched pad to produce a symmetrical pad pair prior to initiation of stitching on the second unstitched pad held by the sewing clamp.

3. The method of making shoulder pads according to claim 1, including the additional step wherein the unloading clamp transports the stitched pad removed from the sewing clamp to a shearing mechanism while the second unstitched pad is being inserted in the sewing clamp by the loading clamp, and the step of shearing the stitched pad to produce a symmetrical pad pair prior to initiation of stitching on the second unstitched pad held by the sewing clamp, and wherein retraction of the loading clamp from the rest position of the sewing clamp after delivery of the second unstitched pad takes place between shearing of the first stitched pad and initiation of stitching on the second unstitched pad held by the sewing clamp and simultaneously with movement of the sewing clamp toward the stitching mechanism.

References Cited in the file of this patent
UNITED STATES PATENTS

| | | |
|---|---|---|
| 1,669,785 | Schmitt | May 15, 1928 |
| 2,425,227 | Bloom | Aug. 5, 1947 |
| 2,714,360 | Saxby | Aug. 2, 1955 |
| 2,982,238 | Fromm | May 2, 1961 |